(12) United States Patent  (10) Patent No.: US 11,554,992 B2
Nakamura et al.  (45) Date of Patent: Jan. 17, 2023

(54) BONDED CERAMIC ASSEMBLY

(71) Applicant: KYOCERA Corporation, Kyoto (JP)

(72) Inventors: Kiyotaka Nakamura, Satsumasendai (JP); Masayuki Moriyama, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 964 days.

(21) Appl. No.: 16/320,427

(22) PCT Filed: Jul. 27, 2017

(86) PCT No.: PCT/JP2017/027300
§ 371 (c)(1),
(2) Date: Jan. 24, 2019

(87) PCT Pub. No.: WO2018/021491
PCT Pub. Date: Feb. 1, 2018

(65) Prior Publication Data
US 2019/0263725 A1  Aug. 29, 2019

(30) Foreign Application Priority Data

Jul. 27, 2016 (JP) .............................. JP2016-147450

(51) Int. Cl.
*B32B 17/06* (2006.01)
*C04B 37/00* (2006.01)

(52) U.S. Cl.
CPC ............ *C04B 37/005* (2013.01); *C04B 37/00* (2013.01); *C04B 37/003* (2013.01); *C04B 2235/3206* (2013.01); *C04B 2235/3208* (2013.01); *C04B 2235/3217* (2013.01); *C04B 2235/3418* (2013.01); *C04B 2237/06* (2013.01); *C04B 2237/064* (2013.01); *C04B 2237/366* (2013.01)

(58) Field of Classification Search
None
See application file for complete search history.

(56) References Cited

U.S. PATENT DOCUMENTS

| 4,326,038 A | * | 4/1982 | Oda | C03C 3/125 |
| | | | | 427/279 |
| 8,334,053 B2 | * | 12/2012 | Shapiro | C03C 3/064 |
| | | | | 428/426 |
| 2014/0328615 A1 | * | 11/2014 | Chaumat | C03C 3/087 |
| | | | | 403/272 |

FOREIGN PATENT DOCUMENTS

| JP | H04265280 A | * | 9/1992 |
| JP | 2004-345952 A | | 12/2004 |

* cited by examiner

*Primary Examiner* — Seth Dumbris
*Assistant Examiner* — Kim S. Horger
(74) *Attorney, Agent, or Firm* — Viering, Jentschura & Partner mbB (57) ABSTRACT

The bonded ceramic assembly of the present disclosure includes a first substrate made of ceramic, a second substrate made of ceramic, and a bonding layer positioned between the first substrate and the second substrate. The bonding layer contains aluminum, at least one of calcium and magnesium, a rare earth element, silicon, and oxygen. Out of a total 100 mass % of all of the components making up the bonding layer, the bonding layer contains from 33 mass % to 65 mass % aluminum in terms of oxide, a total of from 27 mass % to 60 mass % calcium and magnesium in terms of oxide, and from 2 mass % to 12 mass % rare earth element in terms of oxide. The silicon content, in terms of oxide, of the surface of the bonding layer is greater than the silicon content, in terms of oxide, of the interior of the bonding layer.

4 Claims, 8 Drawing Sheets

BONDED CERAMIC ASSEMBLY

TECHNICAL FIELD

The present disclosure relates to a bonded ceramic assembly.

BACKGROUND ART

Ceramic has better heat resistance than metal or resin. Thus, ceramic is used for parts on which objects of treatment, such as various types of elements and parts, are rested or held during heat treatment of the objects of treatment. In recent years, moreover, as the size of apparatus and machines equipped with such parts has increased, greater size or elongation, as well as more complex part shapes, have come to be demanded of such parts. However, it is difficult to integrally form powder compacts having large size or length and complex shapes. Thus, attempts have been made to enable greater part size and length and more complex part shapes by bonding a plurality of sintered compacts having simple shapes.

For example, Patent Document 1 proposes using a bonding agent containing an aluminum nitride ceramic and a fusing material having a composition containing from 25 to 45 weight % CaO, from 5 to 30 weight % $Y_2O_3$, and a remainder of $Al_2O_3$ to bond multiple substrates made of aluminum nitride ceramic.

CITATION LIST

Patent Literature

Patent Document 1: JP 2004-345952 A

SUMMARY OF INVENTION

The bonded ceramic assembly of the present disclosure includes a first substrate made of ceramic, a second substrate made of ceramic, and a bonding layer positioned between the first substrate and the second substrate. The bonding layer contains aluminum, at least one of calcium and magnesium, a rare earth element, silicon, and oxygen. The aluminum content is from 33 mass % to 65 mass %, in terms of oxide, of the total 100 mass % of all components making up the bonding layer. The total calcium and magnesium content, in terms of oxide, is from 27 mass % to 60 mass %. The rare earth element content, in terms of oxide, is from 2 mass % to 12 mass %. The silicon content, in terms of oxide, of the surface of the bonding layer is greater than in the interior of the bonding layer.

DESCRIPTION OF EMBODIMENT

Recently, objects of treatment have come to be more rapidly heated in order to improve manufacturing efficiency. Thus, there is a demand for a bonded ceramic assembly, obtained by bonding multiple pieces of ceramic, that exhibits little reduction in the bond strength between the bonded parts and can be used for extended periods of time.

The bonded ceramic assembly of the present disclosure resists reductions in bond strength even when rapidly heated. The bonded ceramic assembly of the present disclosure will now be described in detail with reference to FIGS. 1 to 8.

A bonded ceramic assembly 10 according to the present disclosure includes a first substrate 1, a second substrate 2, and a bonding layer 3 positioned between the first substrate 1 and the second substrate 2. In the bonded ceramic assemblies 10a, 10b illustrated in FIGS. 1 to 4, first substrates 1a, 1b have circular prismatic shapes, and second substrates 2a, 2b have planar shapes. Meanwhile, in the bonded ceramic assembly 10c illustrated in FIGS. 5 and 6, the first substrate 1c and the second substrate 2c both have circular prismatic shapes. The first substrate 1 and the second substrate 2 are not limited to being circular prismatic and planar in shape, but may have any shape, such as quadrangular prismatic.

Figure 3:
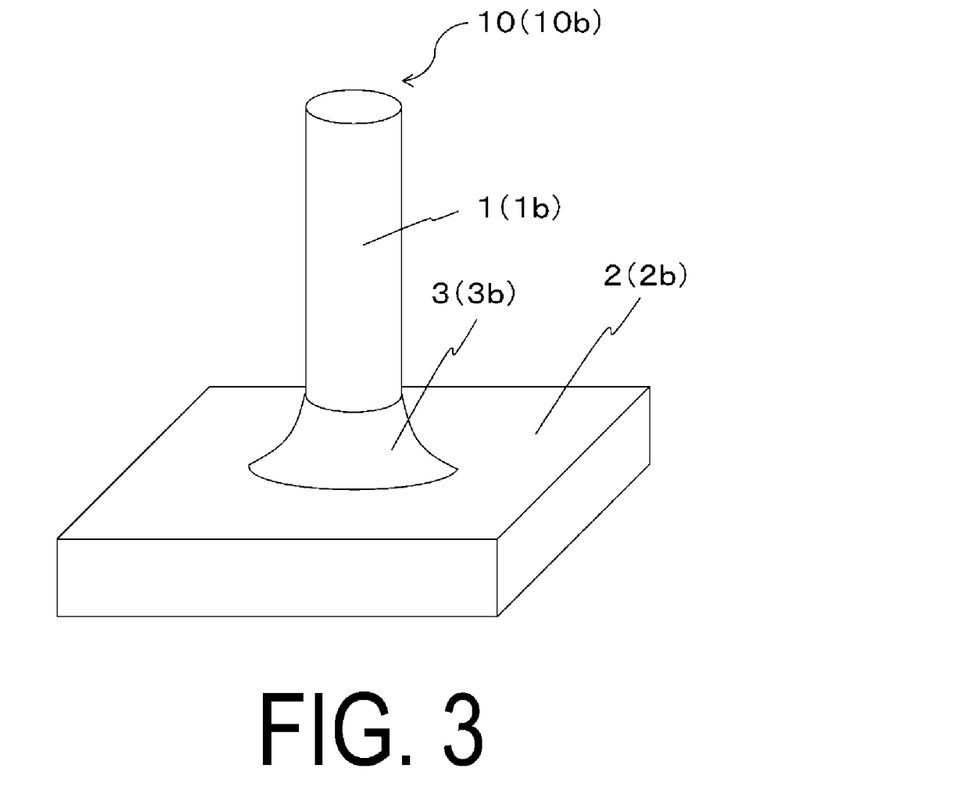
FIG. 3 is a perspective view of another example of the bonded ceramic assembly of the present disclosure.
Figure 4:
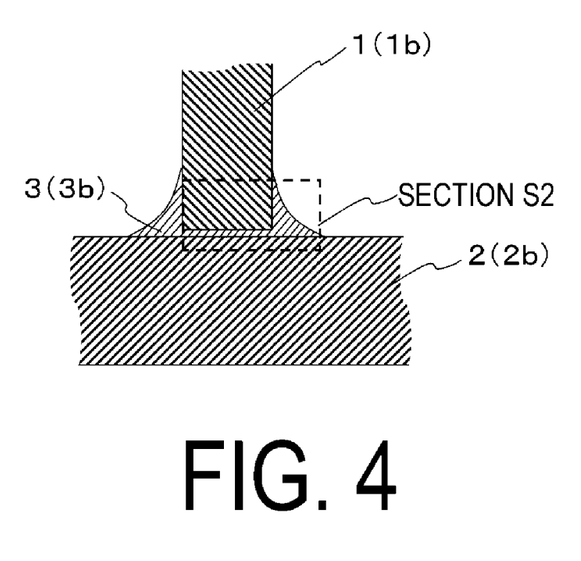
FIG. 4 is a cross-sectional view of the bonded ceramic assembly illustrated in FIG. 3 along the through-thickness direction of the bonded ceramic assembly.

The bonding layer 3 of the bonded ceramic assembly 10 of the present disclosure bonds the first substrate 1 and the second substrate 2. The portion protruding from between the first substrate 1 and the second substrate 2 and positioned around the first substrate 1 and the second substrate 2 as illustrated in FIGS. 3 and 4 is also part of the bonding layer 3.

In the bonded ceramic assembly 10 of the present disclosure, the first substrate 1 and the second substrate 2 are made of ceramic. Silicon carbide ceramic, aluminum oxide ceramic, silicon nitride ceramic, aluminum nitride ceramic, or mullite ceramic, for example, can be used as the ceramic.

In particular, in a case where the first substrate 1 and the second substrate 2 are made of aluminum nitride ceramic, the substrates will exhibit high conformity to temperature changes due to the thermal conductivity of aluminum nitride ceramic. Thus, even if the assembly is rapidly heated, temperature variations within the first substrate 1 and the second substrate 2 will be inhibited, and the occurrence of thermal stress in the bonded ceramic assembly 10 will be inhibited. Aluminum nitride ceramic is ceramic in which at least 70 mass % out of a total of 100 mass % of all components making up the aluminum nitride ceramic is constituted by aluminum nitride.

The material of the first substrate 1 and the second substrate 2 can be confirmed via the following method. First, measurement is performed using an X-ray diffractometer (XRD), and the value of the obtained 2θ (wherein 2θ is diffraction angle) is identified using a JCPDS card. Next, an ICP (Inductively Coupled Plasma) emission spectrophotometer (ICP) is used to quantitatively analyze the constituent components. In a case where the identified constituent component is aluminum nitride, and the aluminum nitride (AlN) content, as determined from the aluminum (Al) content measured using the ICP, is at least 70 mass %, the ceramic is aluminum nitride ceramic. The same holds for other ceramics.

In the bonded ceramic assembly 10 of the present disclosure, the bonding layer 3 contains aluminum, at least one of calcium and magnesium, a rare earth element, silicon, and oxygen. The aluminum content of the bonding layer 3 is from 33 mass % to 65 mass %, in terms of oxide, of the total 100 mass % of all components making up the bonding layer 3. The total calcium and magnesium content, in terms of oxide, is from 27 mass % to 60 mass %. The rare earth element content, in terms of oxide, is from 2 mass % to 12 mass %.

By virtue of aluminum, at least one of calcium and magnesium, and rare earth element contents within the abovementioned ranges in terms of oxides, the bonding layer 3 has high chemical affinity to ceramics. As a result, the first substrate 1 and the second substrate 2 can be strongly bonded. By contrast, in a case where the bonding layer 3 does not contain aluminum, at least one of calcium and magnesium, and a rare earth element within the abovementioned ranges in terms of oxides, the layer will not have high chemical affinity to ceramics. As a result, it will not be possible to strongly bond the first substrate 1 and the second substrate 2.

Figure 7:
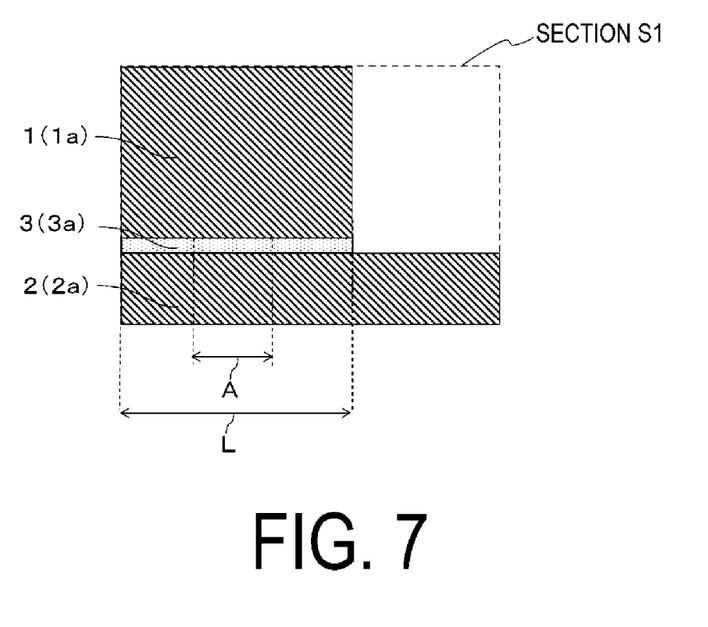
FIG. 7 is an enlarged view of a section S1 indicated in FIG. 2.
Figure 8:
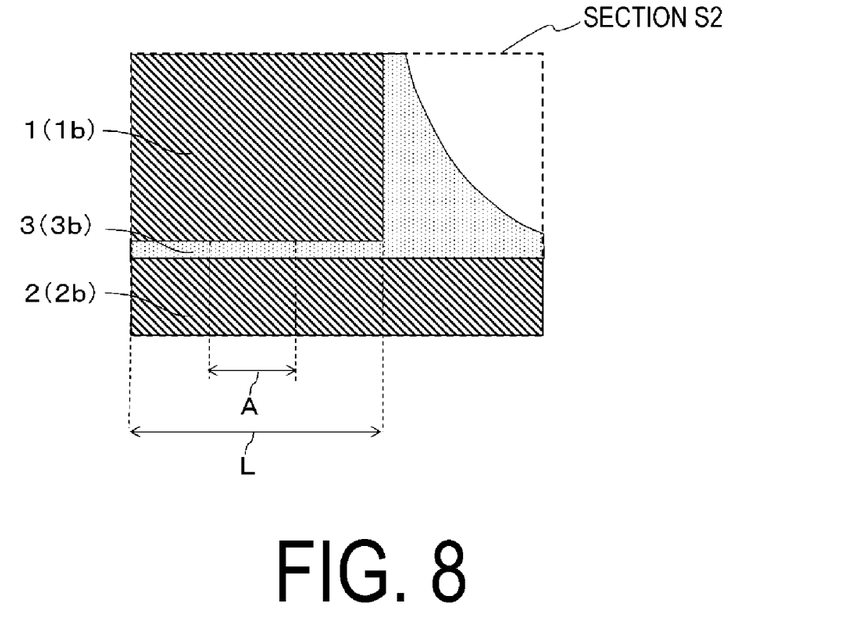
FIG. 8 is an enlarged view of section S2 indicated in FIG. 4.

Moreover, the silicon content, in terms of oxide, of the surface of the bonding layer 3 of the bonded ceramic assembly 10 of the present disclosure is greater than in the interior thereof. The surface of the bonding layer 3 is the surface exposed to the exterior. When measuring the silicon content in terms of oxide of the surface, the portion up to 15 μm from the surface toward the interior is considered the surface in view of the spot size ($\phi$10 μm) of the electron beam generated by the electron probe microanalyzer (EPMA) described hereafter. Meanwhile, the interior of the bonding layer 3 is the middle region (A) when the distance (L) of a region of the bonding layer 3 that contacts the bonding surfaces of the first substrate 1 and the second substrate 2 in a cross section of the bonding layer 3 along the through-thickness direction, as illustrated in FIGS. 7 and 8, is divided into three equal sections. In other words, in a case where the bonding surfaces of the first substrate 1 and the second substrate 2 are circular, the interior of the bonding layer 3, in terms of three-dimensional geometry, is a circular prism of a circular having a diameter of ⅓ L based on the center.

By virtue of satisfying these properties, the bonded ceramic assembly 10 of the present disclosure resists reductions in bond strength even when rapidly heated. The reasons for this are believed to be as follows. The thermal expansion coefficient of silicon oxide is about an order of magnitude less than the thermal expansion coefficients of the oxides of the other components (aluminum, calcium, magnesium, rare earth element) making up the bonding layer 3. Moreover, the silicon content of the bonding layer 3 in terms of oxide is greater at the surface than in the interior, i.e., the thermal expansion coefficient of the surface is less than that of the interior. Thus, when the temperature of the bonded ceramic assembly 10 increases as the result of being rapidly heated, the surface of the bonding layer 3 resists thermal expansion more than the interior, causing compressive stress to act from the surface toward the interior. This compressive stress inhibits the formation of cracks in the bonding layer 3, thereby inhibiting reductions in bond strength.

The amounts of the components other than silicon in the bonding layer 3, in terms of oxides, may be calculated according to the following method. First, the bonded ceramic assembly 10 is cut so as to yield the cross-sectional shape illustrated in FIG. 2, 4, or 6, and the cut surface is machined to a mirror finish using an abrasive material such as diamond abrasive grain. Next, the mirror finished part of the bonding layer 3 is irradiated with an electron beam by an electron probe microanalyzer (EPMA), and the aluminum, calcium, magnesium, and rare earth element contents are measured. The amounts of the components other than silicon of the bonding layer 3 may be calculated by focusing the spot ($\phi$10 μm) at constant intervals (e.g., 100 μm) in the interior of the bonding layer 3 illustrated in FIGS. 7 and 8, and finding the average content of each component at each spot. Alternatively, it is possible to apply the spot ($\phi$10 μm) at constant intervals (e.g., 100 μm), starting at the surface, in a direction retreating from the surface, and find the average content of each component at each spot (not including the surface). The aluminum, calcium, magnesium, and rare earth element oxide contents in terms of oxides can be calculated, from the amounts of each component measured by the EPMA, in terms of aluminum oxide ($Al_2O_3$), calcium oxide (CaO), magnesium oxide (MgO), and rare earth element oxide (yttrium oxide ($Y_2O_3$), samarium oxide ($Sm_2O_3$), lanthanum oxide ($La_2O_3$), cerium oxide ($CeO_2$), neodymium oxide ($Nd_2O_3$), ytterbium oxide ($Er_2O_3$), ytterbium oxide ($Yb_2O_3$), etc.).

In a case where a sample of the bonding layer 3 can be taken from the bonded ceramic assembly 10, sampling is performed after grinding to about 15 μm from the surface of the bonding layer 3. Accordingly, an ICP can be used to measure the aluminum, calcium, magnesium, and rare earth element contents of the bonding layer 3, and by converting these contents to respective oxide contents, the aluminum, calcium, magnesium, and rare earth element oxide contents can be calculated.

Figure 1:
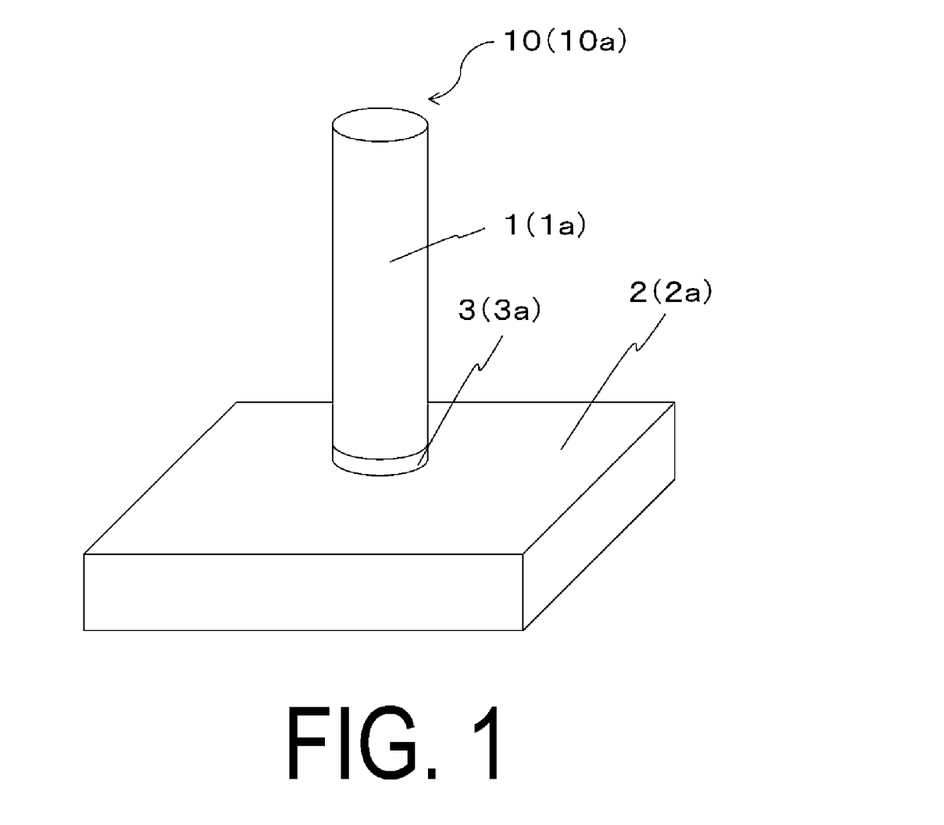
FIG. 1 is a perspective view of one example of a bonded ceramic assembly according to the present disclosure.
Figure 2:
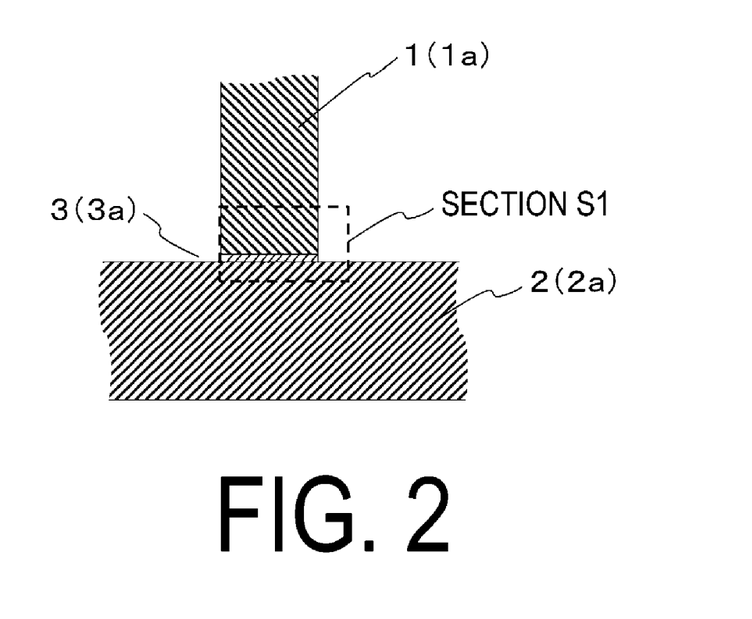
FIG. 2 is a cross-sectional view of the bonded ceramic assembly illustrated in FIG. 1 along the through-thickness direction of the bonded ceramic assembly.
Figure 5:
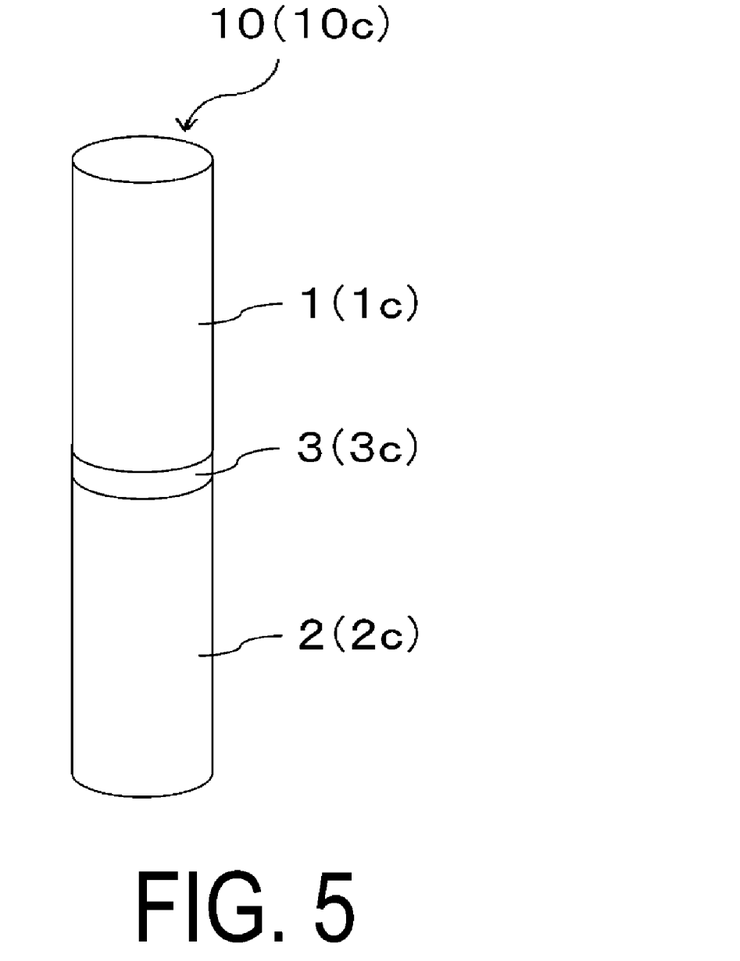
FIG. 5 is a perspective view of another example of the bonded ceramic assembly of the present disclosure.
Figure 6:
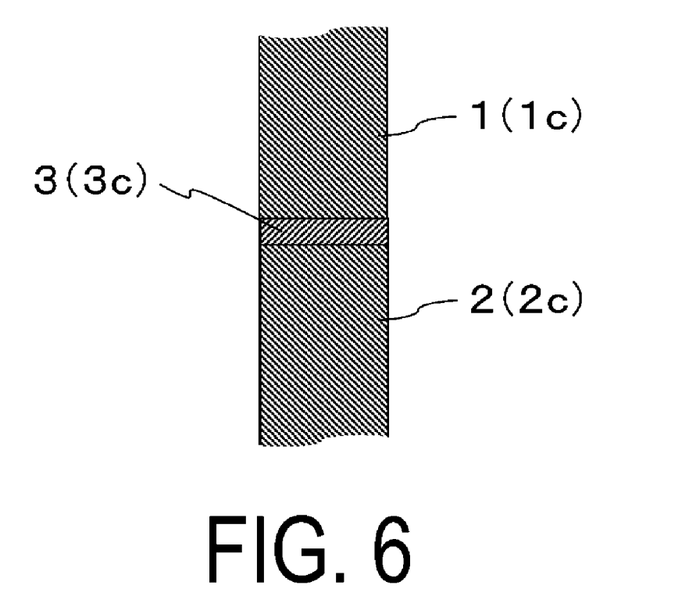
FIG. 6 is a cross-sectional view of the bonded ceramic assembly illustrated in FIG. 5 along the through-thickness direction of the bonded ceramic assembly.

The silicon content of the surface and interior of the bonding layer 3 in terms of oxide may be calculated according to the following method. First, as in the method described above, a mirror-finished surface is formed on the bonding layer 3, after which the mirror-finished surface is irradiated with an electron beam by an EPMA, and the silicon content is measured. In a case where, as illustrated in FIGS. 1 and 5, the bonding layer 3 does not protrude from between the first substrate 1 and the second substrate 2, the spot ($\phi$10 μm) may be applied to at least three locations each of the interior of the bonding layer 3 and the surface of the bonding layer 3, and the averages for each taken as the silicon content of the surface and the interior. In a case where, however, the bonding layer 3 does protrude from between the first substrate 1 and the second substrate 2 as illustrated in FIG. 3, the spot ($\phi$10 μm) may be applied at intervals to at least three locations on the surface of the bonding layer 3, and the average thereof taken as the silicon content of the surface, in order to enable an average for the surface as a whole to be calculated. The silicon oxide content may be calculated by converting from the silicon content measured by the EPMA to silicon oxide ($SiO_2$).

The silicon content, in terms of oxide, of the bonding layer 3 may be at least 3 mass % greater than in the interior thereof. In a case where this property is satisfied, a large amount of compressive stress will act from the surface of the bonding layer 3 toward the interior thereof when the temperature of the bonded ceramic assembly 10 increases as the result of being rapidly heated, thereby further inhibiting crack formation and reductions in bond strength. In a case where no silicon is present in the interior of the bonding layer 3, even greater compressive stress will act from the surface of the bonding layer 3 toward the interior thereof, thereby further inhibiting reductions in bond strength.

The silicon content, in terms of oxide, of the bonding layer 3 may gradually increase from the interior toward the surface. In a case where this property is satisfied, the thermal expansion coefficient of the bonding layer 3 will gradually increase from the interior toward the surface, and continuous compressive stress will act from the surface of the bonding layer 3 toward the interior thereof when the temperature of the bonded ceramic assembly 10 increases as the result of being rapidly heated. This continuous compressive stress further inhibits the formation of cracks in the bonding layer 3, thereby further inhibiting reductions in bond strength.

The following method may be used to confirm whether the silicon content, in terms of oxide, of the bonding layer 3 gradually increases from the interior toward the surface. First, as in the method described above, a mirror-finished surface is formed on the bonding layer 3. EPMA linear analysis is then performed, starting from the surface of the bonding layer 3, in a direction retreating from the surface, and variation in silicon content is measured. EPMA linear analysis is what is referred to as two-dimensional analysis, and is capable of confirming relative variation in the distribution of the amounts of constituent component by altering the measurement position along a straight line. In a case where EPMA linear analysis reveals a stepwise or continuous decrease in silicon content from the surface toward the interior, the silicon content, in terms of oxide, of the bonding layer 3 can be considered to gradually increase from the interior toward the surface.

In a case where the silicon content, in terms of oxide, of the surface of the bonding layer 3 is from 3 mass % to 10 mass % out of the total 100 mass % of all components making up the surface of the bonding layer 3, compressive stress can more effectively act from the surface toward the interior when rapidly heated, thereby further inhibiting reductions in bond strength.

The bonding layer 3 may contain $Y_3Al_5O_{12}$. In a case where this property is satisfied, expansions in cracks formed by rapid heating can be halted by the $Y_3Al_5O_{12}$, thereby inhibiting reductions in bond strength, resulting from $Y_3Al_5O_{12}$ being a compound that exhibits little change in properties when rapidly heated.

In order to determine whether the bonding layer 3 contains $Y_3Al_5O_{12}$, an XRD may be used to measure the bonding layer 3, and the value for the obtained 2θ identified using a JCPDS card.

The bonding layer 3 may contain $Al_6Si_2O_{13}$. In a case where this property is satisfied, expansions in cracks formed by rapid heating can be halted by the $Al_6Si_2O_{13}$, thereby inhibiting reductions in bond strength, resulting from $Al_6Si_2O_{13}$, like $Y_3Al_5O_{12}$, being a compound that exhibits little change in properties when rapidly heated.

In order to determine whether the bonding layer 3 contains $Al_6Si_2O_{13}$, an XRD may be used to measure the bonding layer 3, and the value for the obtained 2θ identified using a JCPDS card.

Defining the X-ray diffraction peak intensity for $Y_3Al_5O_{12}$ in the (640) plane in Miller index notation as A and the X-ray diffraction peak intensity for $Al_6Si_2O_{13}$ in the (210) plane in Miller index notation as B, the ratio B/A may be greater on the surface of the bonding layer 3 than in the interior thereof. Because the thermal expansion coefficient of $Y_3Al_5O_{12}$ is about $8 \times 10^{-6}$ ppm/° C. and the thermal expansion coefficient of $Al_6Si_2O_{13}$ is about $5.3 \times 10^{-6}$ ppm/° C., the thermal expansion coefficient of the bonding layer 3 will be lower on the surface than in the interior in a case where this property is satisfied. Thus, when the temperature of the bonded ceramic assembly 10 increases as the result of being rapidly heated, the surface of the bonding layer 3 resists thermal expansion more than the interior, causing compressive stress to act from the surface toward the interior. This compressive stress inhibits the formation of cracks in the bonding layer 3, thereby further inhibiting reductions in bond strength.

The ratio B/A on the surface of the bonding layer 3 may be calculated according to the following method. First, an XRD is used to measure the surface of the bonding layer 3, and the value of the X-ray diffraction peak intensity A near 2θ=33.2°, which is the (640) plane of $Y_3Al_5O_{12}$, is confirmed. Similarly, the value of the X-ray diffraction peak intensity B near 2θ=26.5°, which is the (210) plane of $Al_6Si_2O_{13}$, is confirmed. The ratio B/A on the surface of the bonding layer 3 may then be calculated by dividing the value of the X-ray diffraction peak intensity B by the value of the X-ray diffraction peak intensity A. Meanwhile, the ratio B/A in the interior of the bonding layer 3 may be calculated by cutting the bonded ceramic assembly 10 so as to yield the cross-sectional shape illustrated in FIG. 2, 4, or 6, machining the cut surface to a mirror finish using an abrasive material such as diamond abrasive grain, and using an XRD to measure the interior of the bonding layer 3 in the mirror-finished portion.

In a case where the porosity of the bonding layer 3 is 6% or less, the bonding layer 3 will be dense. Thus, even if the bonded ceramic assembly 10 is used, for example, in a corrosive gas, penetration of the bonding layer 3 by the corrosive gas can be inhibited, thereby inhibiting reductions in bond strength.

Next, an example of a method of manufacturing the bonded ceramic assembly 10 of the present disclosure will be described. In this example, the first substrate 1 and second substrate 2 are made of aluminum nitride ceramic.

First, a first substrate 1 and second substrate 2 of aluminum nitride ceramic are manufactured according to the following method. First, a slurry obtained by mixing powdered aluminum nitride, a sintering aid, a binder, and a solvent is spray-dried via spray drying to produce granules. Next, a mold is filled with the obtained granules, and pressurized to manufacture compacts. The compacts may be formed by forming green sheets from the slurry using a doctor blade method, using a mold or laser to form the sheets into a desired shape, and layering.

Next, the compact is dried and degreased. The compacts are then fired by being kept at a temperature of 1700° C. to 2000° C. in a nitrogen gas atmosphere to obtain a first substrate 1 and a second substrate 2 made of aluminum nitride ceramic.

Next, a first paste used to form the bonding layer 3 (containing, for example, powdered aluminum oxide ($Al_2O_3$), powdered calcium carbonate ($CaCO_3$), powdered yttrium oxide ($Y_2O_3$) as a rare earth element oxide, powdered silicon oxide ($SiO_2$), and an acrylic binder in an organic solvent) is prepared. The amounts of powdered aluminum oxide, powdered calcium carbonate, powdered yttrium oxide, and powdered silicon oxide in the first paste are adjusted so that, out of a total 100 mass % of all the components making up the bonding layer 3, the aluminum oxide in terms of oxide is from 33 mass % to 65 mass %, the calcium content in terms of oxide is from 27 mass % to 60 mass %, and the yttrium content in terms of oxide is from 2 mass % to 12 mass %.

Next, a second paste used to form the bonding layer 3 (containing, for example, powdered aluminum oxide, powdered calcium carbonate, powdered yttrium oxide, powdered silicon oxide, and an acrylic binder in an organic solvent) is prepared.

Apart from the proportion of powdered silicon oxide being greater than in the first paste, the second paste satisfies the proportions of powdered aluminum oxide, powdered calcium carbonate, and powdered yttrium oxide in the first paste described above. The proportion of powdered silicon oxide in the second paste can be adjusted to obtain a bonding layer 3 having a surface silicon content, in terms of oxide, that is at least 3 mass % greater than in the interior.

Some of the powdered aluminum oxide and powdered yttrium oxide in the first paste and the second paste can be replaced with $Y_3Al_5O_{12}$ to obtain a bonding layer 3 containing $Y_3Al_5O_{12}$. The proportions of the various powders are adjusted to yield the aluminum, calcium, and yttrium contents described above in the bonding layer 3.

Some of the powdered aluminum oxide and powdered silicon oxide in the first paste and the second paste can be replaced with $Al_6Si_2O_{13}$ to obtain a bonding layer 3 containing $Al_6Si_2O_{13}$. The proportions of the various powders are adjusted to yield the aluminum, calcium, and yttrium contents described above in the bonding layer 3, with the silicon content in terms of oxide being greater in the second paste than in the first paste.

The mass ratio $Al_6Si_2O_{13}/Y_3Al_5O_{12}$ of powdered $Al_6Si_2O_{13}$ to powdered $Y_3Al_5O_{12}$ may be adjusted so as to be greater in the second paste than in the first paste. Adjusting the ratio in this way makes it possible for the ratio B/A of the X-ray diffraction peak intensity A for $Y_3Al_5O_{12}$ in the (640) plane and the X-ray diffraction peak intensity B for $Al_6Si_2O_{13}$ in the (210) plane to be greater on the surface than in the interior.

Next, the first paste is applied to the center of the bonding surface of either the first substrate 1 or the second substrate 2, after which the second substrate 2 is applied to the remaining area to which the first paste has not been applied, followed by placing the bonding surfaces together and applying pressure in a direction perpendicular to the bonding surfaces. Alternatively, the first paste may be applied to the bonding surface of either the first substrate 1 or the second substrate 2, the bonding surfaces placed together, and pressure applied in a direction perpendicular to the bonding surfaces, followed by applying the second paste so as to cover the surface of the first paste. The applied pressure may be that yielded by the weight of the members being bonded.

Next, drying is performed at a holding temperature of 100° C. to 150° C. and a retention time of 0.2 hours to 5 hours. After drying, thermal treatment is performed at a holding temperature of 1400° C. to 1570° C. and a retention time of 0.2 hours to 5 hours in a nitrogen gas atmosphere to obtain the bonded ceramic assembly 10 of the present disclosure.

Alternatively, to yield an increasing silicon content, in terms of oxide, from the interior of the bonding layer 3 toward the surface thereof, a third paste (containing, for example, powdered aluminum oxide, powdered calcium carbonate, powdered yttrium oxide, powdered silicon oxide, and an acrylic binder in an organic solvent) containing a larger proportion of powdered silicon oxide than the first paste and a smaller proportion of powdered silicon oxide than the second paste may be applied between the first paste and the second paste. Applying the third paste in this way yields a gradually increasing silicon content, in terms of oxide, from the interior of the bonding layer 3 toward the surface thereof. The third paste satisfies the proportions of powdered aluminum oxide, powdered calcium carbonate, and powdered yttrium oxide in the first paste described above.

Example 1

A first substrate and second substrate of aluminum nitride ceramic were manufactured according to the following method. First, a slurry obtained by mixing powdered aluminum nitride, a sintering aid, a binder, and a solvent was spray-dried via spray drying to produce granules. A powdered mixture of powdered yttrium oxide and powdered calcium carbonate was used as a sintering aid. The proportions of powdered aluminum nitride and sintering aid in the formulation were adjusted to yield a powdered aluminum nitride content of 94 mass %, a powdered yttrium oxide content of 5.8 mass %, and a powdered calcium carbonate content of 0.2 mass %. Next, a mold was filled with the obtained granules, and pressurized to manufacture compacts. The compacts were then degreased, and fired by being kept for 3 hours at a temperature of 1750° C. in a nitrogen gas atmosphere to obtain a first substrate and a second substrate made of aluminum nitride ceramic. The first substrate had a circular prismatic shape of diameter 26 mm and length 70 mm, and the second substrate had a planar shape of 60 mm×50 mm×7 mm.

Next, a first paste and a second paste for forming the bonding layer were prepared. The first paste and the second paste were prepared by adjusting the amounts of powdered aluminum oxide, powdered calcium carbonate, powdered magnesium carbonate, powdered rare earth element oxide, and powdered silicon oxide so as to yield the bonding layer compositions listed in Table 1, and adding 7 parts by mass terpineol as an organic solvent and 10 parts by mass acrylic resin as a binder per total 100 parts by mass of these powders.

Next, the first paste was applied to the bonding surface of the first substrate. Next, the first substrate was rested upon the second substrate, and pressure was applied in a direction perpendicular to the bonding surfaces. The second paste was then applied so as to cover the surface of the first paste. The first paste was applied so as to yield a bonding layer thickness of 50 μm.

Next, drying was performed at a holding temperature of 120° C. and a retention time of 2 hours. After drying, a thermal treatment was performed in a nitrogen gas atmosphere at a holding temperature of 1510° C. and a retention time of 2 hours to obtain samples having the shape illustrated in FIG. 3.

Next, the amounts of the various components, in terms of oxide, in the bonding layers of the samples were calculated according to the following method. First, the samples were cut so as to have the cross-sectional shape illustrated in FIG. 4, and the cut surfaces were machined to mirror finishes using diamond abrasive grain as an abrasive material. Next, the mirror-finished bonding layers were irradiated with an electron beam by an EPMA to measure the amounts of the various components. The amount of each component was determined by applying the spot (ϕ10 μm) at intervals of 100 μm in a direction retreating from the surface of the bonding layer, starting at the surface, and calculating the average amount of each component in each spot (not including the surface). The amount of each component in terms of oxide was determined by converting the amount of each component to oxides.

The silicon content of the surface and the interior in terms of oxide was calculated according to the following method.

First, the spot (φ10 μm) of an electron beam generated by an EPMA was applied at three locations in the interior of the bonding layer, and the average of the silicon content measured at each spot was taken as the silicon content of the interior. Meanwhile, so as to be able to calculate an average value for the surface as a whole, the spot (φ10 μm) of the electron beam of the EPMA was applied at three locations on the surface of the bonding layer with spaces therebetween, and the average of the silicon content measured at each spot was taken as the silicon content of the surface. The silicon content in terms of oxide was then calculated by converting the silicon content measured by the EPMA to silicon oxide.

Next, the bond strength at room temperature of other samples manufactured according to the method described above was measured. First, the second substrate of each sample was anchored using a jig, in which state a load in a direction parallel to the bonding surface was applied to that end thereof to which the first substrate was not bonded. The load was then gradually increased, and the bond strength M1 at which the first substrate released from the second substrate was measured. The bond strength M1 was the average value for five samples of each sample.

Next, a heat cycle test of repeated heating and cooling was performed on yet other samples manufactured according to the method described above. Heating and cooling conditions were as follows. In the first cycle, heating was performed from room temperature to 700° C. at a heating rate of 1400° C./hour, and the temperature was held at 700° C. for 30 minutes, then cooled to 130° C. at a cooling rate of 300° C./hour. In the second cycle, heating was performed from 130° C. to 700° C. at a heating rate of 1400° C./hour, and the temperature was held at 700° C. for 30 minutes, then cooled to 130° C. at a cooling rate of 300° C./hour. Heating and cooling were repeated eight times under the same conditions as in the second cycle, for a total of 10 heating and cooling cycles. Heating and cooling were performed in an air atmosphere in all cases. After the heat cycle test, the bond strengths M2 at room temperature of the various samples were measured using the method by which bond strength M1 described above was measured. The bond strength M2 was the average value for five samples of each sample.

The bond strength decrease rate $\Delta M = (M1-M2)/M1 \times 100$ (%) was calculated from the bond strength M1 before the heat cycle test and the bond strength M2 after the heat cycle test.

Results are shown in Table 1.

TABLE 1

| Sample No. | Al₂O₃ (mass %) | SiO₂ (mass %) Average | SiO₂ (mass %) Surface | SiO₂ (mass %) Interior | CaO (mass %) | MgO (mass %) | CaO + MgO (mass %) |
|---|---|---|---|---|---|---|---|
| 1 | 45 | 0.5 | 1 | 0 | 52 | 0 | 52 |
| 2 | 33 | 1 | 2 | 0 | 60 | 0 | 60 |
| 3 | 45 | 3 | 4 | 2 | 49 | 0 | 49 |
| 4 | 45 | 1 | 2 | 0 | 51 | 0 | 51 |
| 5 | 45 | 3 | 4 | 2 | 41 | 8 | 49 |
| 6 | 45 | 2 | 4 | 0 | 50 | 0 | 50 |
| 7 | 55 | 2 | 3 | 1 | 40 | 0 | 40 |
| 8 | 65 | 2.5 | 3 | 2 | 27 | 0 | 27 |
| 9 | 65 | 2.5 | 3 | 2 | 0 | 27 | 27 |
| 10 | 45 | 1 | 2 | 0 | 51 | 0 | 51 |
| 11 | 45 | 1 | 2 | 0 | 51 | 0 | 51 |
| 12 | 45 | 1 | 2 | 0 | 51 | 0 | 51 |
| 13 | 45 | 1 | 2 | 0 | 51 | 0 | 51 |
| 14 | 45 | 6 | 7 | 5 | 0 | 46 | 46 |
| 15 | 45 | 9 | 10 | 8 | 40 | 3 | 43 |
| 16 | 50 | 1.5 | 3 | 0 | 46 | 0 | 46 |
| 17 | 45 | 2 | 4 | 0 | 50 | 0 | 50 |
| 18 | 50 | 2 | 4 | 0 | 46 | 0 | 46 |
| 19 | 50 | 3 | 6 | 0 | 45 | 0 | 45 |
| 20 | 50 | 5 | 10 | 0 | 43 | 0 | 43 |
| 21 | 50 | 1 | 2 | 0 | 44 | 0 | 44 |
| 22 | 50 | 1 | 2 | 0 | 41 | 0 | 41 |
| 23 | 50 | 1 | 2 | 0 | 37 | 0 | 37 |
| 24 | 45 | 4 | 8 | 0 | 45 | 0 | 45 |
| 25 | 67 | 0.5 | 1 | 0 | 29 | 0 | 29 |
| 26 | 30 | 0.5 | 1 | 0 | 60 | 0 | 60 |
| 27 | 64 | 0.5 | 1 | 0 | 26 | 0 | 26 |
| 28 | 33 | 0.5 | 1 | 0 | 61 | 0 | 61 |
| 29 | 50 | 3 | 6 | 0 | 46 | 0 | 46 |
| 30 | 50 | 3 | 6 | 0 | 34 | 0 | 34 |
| 31 | 45 | 1 | 1 | 1 | 52 | 0 | 52 |
| 32 | 33 | 1 | 0 | 2 | 58 | 5 | 63 |
| 33 | 45 | 1 | 0 | 2 | 0 | 51 | 51 |
| 34 | 45 | 1 | 0 | 2 | 52 | 0 | 52 |
| 35 | 45 | 2 | 1 | 3 | 50 | 0 | 50 |
| 36 | 65 | 1 | 0 | 2 | 27 | 0 | 27 |

| Sample No. | Rare earth element oxide | Rare earth element oxide (mass %) Content | Surface/interior SiO₂ (mass %) | Bond strength M1 (MPa) | Bond strength M2 (MPa) | Bond strength decrease rate ΔM (%) |
|---|---|---|---|---|---|---|
| 1 | Y₂O₃ | 2.5 | 1 | 227 | 204 | 10.1 |
| 2 | Y₂O₃ | 6 | 1 | 220 | 200 | 9.1 |

TABLE 1-continued

| | | | | | |
|---|---|---|---|---|---|
| 3 | Y₂O₃ | 3 | 2 | 235 | 213 | 9.4 |
| 4 | Y₂O₃ | 3 | 2 | 231 | 209 | 9.5 |
| 5 | Y₂O₃ | 3 | 2 | 230 | 209 | 9.1 |
| 6 | Y₂O₃ | 3 | 2 | 233 | 211 | 9.4 |
| 7 | Y₂O₃ | 3 | 2 | 237 | 214 | 9.7 |
| 8 | Y₂O₃ | 5.5 | 1 | 235 | 213 | 9.4 |
| 9 | Y₂O₃ | 5.5 | 1 | 231 | 209 | 9.5 |
| 10 | Nd₂O₃ | 3 | 1 | 222 | 200 | 9.9 |
| 11 | Sm₂O₃ | 3 | 1 | 234 | 212 | 9.4 |
| 12 | Yb₂O₃ | 3 | 1 | 226 | 205 | 9.3 |
| 13 | Er₂O₃ | 3 | 1 | 229 | 207 | 9.6 |
| 14 | Y₂O₃ | 3 | 2 | 231 | 209 | 9.5 |
| 15 | Y₂O₃ | 3 | 2 | 229 | 208 | 9.2 |
| 16 | Y₂O₃ | 2.5 | 3 | 229 | 216 | 5.7 |
| 17 | Y₂O₃ | 3 | 4 | 230 | 217 | 5.7 |
| 18 | Sm₂O₃ | 2 | 4 | 233 | 216 | 7.3 |
| 19 | Y₂O₃ | 2 | 6 | 231 | 216 | 6.5 |
| 20 | Y₂O₃ | 2 | 10 | 229 | 217 | 5.2 |
| 21 | Y₂O₃ | 5 | 2 | 234 | 215 | 8.1 |
| 22 | Y₂O₃ | 8 | 2 | 230 | 211 | 8.3 |
| 23 | Y₂O₃ | 12 | 2 | 220 | 202 | 8.2 |
| 24 | Y₂O₃ | 6 | 4 | 239 | 226 | 5.4 |
| 25 | Y₂O₃ | 3.5 | 1 | 199 | 179 | 10.1 |
| 26 | Y₂O₃ | 9.5 | 1 | 200 | 180 | 10.0 |
| 27 | Y₂O₃ | 9.5 | 1 | 204 | 184 | 9.8 |
| 28 | Y₂O₃ | 5.5 | 1 | 202 | 182 | 9.9 |
| 29 | Y₂O₃ | 1 | 6 | 205 | 190 | 7.3 |
| 30 | Y₂O₃ | 13 | 6 | 203 | 189 | 6.9 |
| 31 | Y₂O₃ | 2 | 0 | 227 | 190 | 19.5 |
| 32 | Y₂O₃ | 3 | -2 | 233 | 190 | 18.5 |
| 33 | Y₂O₃ | 3 | -2 | 235 | 189 | 19.6 |
| 34 | Y₂O₃ | 2 | -2 | 227 | 187 | 17.6 |
| 35 | Y₂O₃ | 3 | -2 | 235 | 189 | 19.6 |
| 36 | Y₂O₃ | 7 | -2 | 239 | 187 | 21.8 |

The results listed in Table 1 reveal that Samples No. 1 to 24 and 31 to 36, in which the bonding layer contains from 33 mass % to 65 mass % aluminum in terms of oxide, a total of from 27 mass % to 60 mass % calcium and magnesium in terms of oxide, and from 2 mass % to 12 mass % rare earth element in terms of oxide, had high bond strengths M1 of at least 220 MPa.

Samples No. 1 to 30, in which the relationship of the silicon content in the bonding layer in terms of oxide is surface>interior, had lower bond strength decrease rates ΔM than in Sample No. 31, in which surface=interior, and Samples No. 32 to 36, in which surface<interior.

From these results, it was determined that Samples No. 1 to 24, in which the bonding layer contains from 33 mass % to 65 mass % aluminum in terms of oxide, a total of from 27 mass % to 60 mass % calcium and magnesium in terms of oxide, and from 2 mass % to 12 mass % rare earth element in terms of oxide, and had a higher silicon content in terms of oxide on the surface than in the interior, exhibited little reduction in bond strength even when rapidly heated, while possessing high bond strength.

Among Samples No. 1 to 24, Samples No. 16 to 20 and 24 in particular, in which the silicon content of the bonding layer in terms of oxide was at least 3 mass % greater on the surface than in the interior, had even lower bond strength decrease rates ΔM of 7.3% or less, and less reduction in bonding layer even when rapidly heated.

Example 2

A sample was manufactured in which the silicon content, in terms of oxide, of the bonding layer gradually increased from the interior toward the surface. Sample No. 38, in which the silicon content of the bonding layer in terms of oxide gradually increased from the interior toward the surface, was manufactured in the same way as Sample No. 24 in Example 1, except that, after the application of the first paste, a third paste prepared so as to contain half the proportion of silicon oxide powder as the first paste and the second paste was applied, after which the second paste was applied.

Next, the following method was used to confirm whether the silicon content of the bonding layer in terms of oxide gradually increased from the interior toward the surface in Sample No. 38. First, a mirror finished was formed on the bonding layer in the same way as in Example 1. EPMA linear analysis was then performed from the interior toward the surface of the mirror-finished section of the bonding layer to measure variation in silicon content. The results revealed a stepwise increase in silicon content from the surface toward the interior, thereby indicating a gradual increase in the silicon content of the bonding layer in terms of oxide from the interior thereof toward the surface thereof.

Next, bond strengths M1, M2 were measured and the bond strength decrease rate ΔM was calculated as in Example 1.

Results are shown in Table 2. In Table 2, Sample No. 24 of Example 1, in which the silicon content of the bonding layer in terms of oxide does not gradually increase from the interior toward the surface thereof, is listed as Sample No. 37 for comparison.

TABLE 2

| Sample No. | Gradual increase in silicon | Bond strength M1 (MPa) | M2 (MPa) | Bond strength decrease rate ΔM (%) |
|---|---|---|---|---|
| 37 | Not present | 239 | 226 | 5.4 |
| 38 | Present | 239 | 233 | 2.5 |

As shown by the results listed in Table 2, a comparison of Samples No. 37 and 38 reveals that Sample No. 38 had a lower bond strength decrease rate ΔM. From these results, it was determined that the silicon content of the bonding layer in terms of oxide gradually increased from the interior toward the surface thereof, resulting in even less reduction in bond strength when rapidly heated.

Example 3

Samples in which $Y_3Al_5O_{12}$ was variously present or absent in the bonding layer were manufactured. The samples were manufactured in the same way as Sample No. 4 in Example 1, except that powdered $Y_3Al_5O_{12}$ was added to the first paste and the second paste in the amounts listed in Table 3. The proportions of the other powders were adjusted to yield the composition of the bonding layer of Sample No. 4 in Example 1.

Next, the presence or absence of $Y_3Al_5O_{12}$ on the surfaces and in the interiors of the bonding layers of the samples was confirmed according to the following method. An XRD was used to measure the surfaces of the bonding layers, and the values of the obtained 2θ were identified using a JCPDS card to confirm whether $Y_3Al_5O_{12}$ was present on the surfaces of the bonding layers.

Next, the samples were cut so as to have the cross-sectional shape illustrated in FIG. 4, and the cut surfaces were machined to mirror finishes using diamond abrasive grain as an abrasive material. An XRD was then used to measure the interiors of the bonding layers in the mirror-finished sections, and the values of the obtained 2θ were identified using a JCPDS card to confirm whether or not $Y_3Al_5O_{12}$ was present in the interiors of the bonding layers.

Next, bond strengths M1, M2 were measured and the bond strength decrease rate ΔM was calculated as in Example 1.

Results are shown in Table 3.

TABLE 3

| Sample No. | Powdered $Y_3Al_5O_{12}$ (mass %) | | Presence/absence of $Y_3Al_5O_{12}$ in bonding layer | | Bond strength | | Bond strength decrease rate ΔM (%) |
| --- | --- | --- | --- | --- | --- | --- | --- |
| | First paste | Second paste | Interior | Surface | M1 (MPa) | M2 (MPa) | |
| 39 | 0 | 0 | Absent | Absent | 231 | 209 | 9.5 |
| 40 | 0 | 3 | Absent | Present | 233 | 213 | 8.6 |
| 41 | 3 | 0 | Present | Absent | 233 | 213 | 8.6 |
| 42 | 3 | 3 | Present | Present | 233 | 216 | 7.3 |

As shown by the results listed in Table 3, Samples No. 40 to 42 had lower bond strength decrease rates ΔM than Sample No. 39. From these results, it was determined that there was less reduction in bond strength if the bonding layer contained $Y_3Al_5O_{12}$.

Example 4

Samples in which $Al_6Si_2O_{13}$ was variously present or absent in the bonding layer were manufactured. The samples were manufactured in the same way as Sample No. 42 in Example 3, except that powdered $Al_6Si_2O_{13}$ was added to the first paste and the second paste in the amounts listed in Table 4. The proportions of the other powders were adjusted to yield the composition of the bonding layer of Sample No. 42 in Example 3.

Next, the presence or absence of $Al_6Si_2O_{13}$ on the surfaces and in the interiors of the bonding layers of the samples was confirmed according to the following method. An XRD was used to measure the surfaces of the bonding layers, and the values of the obtained 2θ were identified using a JCPDS card to confirm whether $Al_6Si_2O_{13}$ was present on the surfaces of the bonding layers. Next, the samples were cut so as to have the cross-sectional shape illustrated in FIG. 4, and the cut surfaces were machined to mirror finishes using diamond abrasive grain as an abrasive material. An XRD was then used to measure the interiors of the bonding layers in the mirror-finished sections, and the values of the obtained 2θ were identified using a JCPDS card to confirm whether $Al_6Si_2O_{13}$ was present in the interiors of the bonding layers.

Next, bond strengths M1, M2 were measured and the bond strength decrease rate ΔM was calculated as in Example 1.

Results are shown in Table 4.

TABLE 4

| Sample No. | Powdered Al$_6$Si$_2$O$_{13}$ (mass %) | | Presence/absence of Al$_6$Si$_2$O$_{13}$ in bonding layer | | Bond strength | | Bond strength decrease rate ΔM (%) |
|---|---|---|---|---|---|---|---|
| | First paste | Second paste | Interior | Surface | M1 (MPa) | M2 (MPa) | |
| 43 | 0 | 0 | Absent | Absent | 233 | 216 | 7.3 |
| 44 | 0 | 3 | Absent | Present | 233 | 224 | 3.9 |
| 45 | 3 | 0 | Present | Absent | 233 | 221 | 5.2 |
| 46 | 3 | 3 | Present | Present | 233 | 222 | 4.7 |

As shown by the results listed in Table 4, Samples No. 44 to 46 had lower bond strength decrease rates ΔM than sample No. 43. From these results, it was determined that there was less reduction in bond strength if the bonding layer contained Al$_6$Si$_2$O$_{13}$.

Example 5

Samples having different Y$_3$Al$_5$O$_{12}$ and Al$_6$Si$_2$O$_{13}$ contents on the surfaces and in the interiors of the bonding layers were manufactured. The samples were manufactured in the same way as sample No. 46 in Example 4, except that powdered Y$_3$Al$_5$O$_{12}$ and powdered Al$_6$Si$_2$O$_{13}$ were added to the first paste and the second paste in the amounts listed in Table 5. The proportions of the other powders were adjusted to yield the composition of the bonding layer of sample No. 46 in Example 4.

Next, the ratios B/A on the surfaces of the bonding layers of the samples were calculated according to the following method. First, an XRD was used to measure the surfaces of the bonding layers, and the value of the X-ray diffraction peak intensity A near 2θ=33.2°, which is the (640) plane of Y$_3$Al$_5$O$_{12}$, was confirmed. Similarly, the value of the X-ray diffraction peak intensity B near 2θ=26.5°, which is the (210) plane of Al$_6$Si$_2$O$_{13}$, was confirmed. The ratio B/A on the surface of the bonding layer was then calculated by dividing the value of the X-ray diffraction peak intensity B by the value of the X-ray diffraction peak intensity A. The ratio B/A in the interior of the bonding layer was calculated by cutting the samples so as to have the cross-sectional shape illustrated in FIG. 4, machining the cut surfaces to a mirror finish using an abrasive material such as diamond abrasive grain, and using an XRD to measure the interiors of the bonding layers in the mirror-finished portion.

Next, bond strengths M1, M2 were measured and the bond strength decrease rate ΔM was calculated as in Example 1.

Results are shown in Table 5.

As shown by the results listed in Table 5, Samples No. 48 to 50 had lower bond strength decrease rates ΔM than Samples No. 47, 51, and 52. From these results, it was determined that there was less reduction in bond strength if the ratio B/A was greater on the surface of the bonding layer than in the interior thereof.

REFERENCE SIGNS LIST 1, 1a, 1b, 1c First substrate
2, 2a, 2b, 2c Second substrate
3, 3a, 3b, 3a Bonding layer
10, 10a, 10b, 10c Bonded ceramic assembly

What is claimed is:
1. A bonded ceramic assembly comprising
a first substrate made of ceramic;
a second substrate made of ceramic; and
a bonding layer positioned between the first substrate and the second substrate, the bonding layer containing aluminum, at least one of calcium and magnesium, a rare earth element, silicon, and oxygen;
wherein of the total 100 mass % of all components making up the bonding layer, an amount of aluminum oxide ranges from 33 mass % to 65 mass %; a total amount of calcium oxide and magnesium oxide ranges from 27 mass % to 60 mass %; an amount of rare earth element oxide ranges from 2 mass % to 12 mass %;
further wherein an amount of silicon dioxide at a surface of the bonding layer is greater than an amount of silicon dioxide at an interior of the bonding layer; and
further wherein a portion of the aluminum oxide and a portion of the rare earth element oxide and a portion of the silicon dioxide oxide are replaced with Y$_3$Al$_5$O$_{12}$ and Al$_6$Si$_2$O$_{13}$, wherein defining X-ray diffraction peak intensity for Y$_3$Al$_5$O$_{12}$ in the (640) plane in Miller

TABLE 5

| Sample No. | Powdered Y$_3$Al$_5$O$_{12}$ (mass %) | | Powdered Al$_6$Si$_2$O$_{13}$ (mass %) | | B/A (—) | | Bond strength | | Bond strength decrease rate ΔM (%) |
|---|---|---|---|---|---|---|---|---|---|
| | First paste | Second paste | First paste | Second paste | Interior | Surface | M1 (MPa) | M2 (MPa) | |
| 47 | 3 | 3 | 3 | 3 | 1.4 | 1.4 | 233 | 222 | 4.7 |
| 48 | 6 | 3 | 3 | 3 | 0.8 | 1.4 | 233 | 228 | 2.1 |
| 49 | 3 | 3 | 3 | 6 | 1.4 | 3.3 | 233 | 228 | 2.1 |
| 50 | 3 | 3 | 0 | 3 | 0 | 1.4 | 233 | 228 | 2.1 |
| 51 | 3 | 3 | 6 | 3 | 3.3 | 1.4 | 233 | 221 | 5.2 |
| 52 | 3 | 3 | 3 | 0 | 1.4 | 0 | 233 | 221 | 5.2 | index notation as A and defining X-ray diffraction peak intensity for $Al_6Si_2O_{13}$ in the (210) plane in Miller index notation as B, the ratio B/A is greater on the surface of the bonding layer than in the interior thereof.

2. The bonded ceramic assembly according to claim 1, wherein the silicon dioxide of the bonding layer is at least 3 mass % greater on the surface than in the interior thereof.

3. The bonded ceramic assembly according to claim 1, wherein the silicon dioxide of the bonding layer gradually increases from the interior of the bonding layer toward the surface of the bonding layer.

4. The bonded ceramic assembly according to claim 1, wherein the first substrate and the second substrate are made of aluminum nitride ceramic.

* * * * *